(12) United States Patent
Garaas et al.

(10) Patent No.: US 9,248,525 B2
(45) Date of Patent: Feb. 2, 2016

(54) METHOD AND SYSTEM FOR CUTTING FEATURES FROM SHEET MATERIALS WITH A LASER CUTTER ACCORDING TO A PATTERN

(75) Inventors: Tyler W Garaas, Boston, MA (US); Matthew Brand, Newton, MA (US); Cibulka Josef, Praha (CS)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 563 days.

(21) Appl. No.: 13/535,271

(22) Filed: Jun. 27, 2012

(65) Prior Publication Data

US 2014/0005822 A1    Jan. 2, 2014

(51) Int. Cl.
*B23K 26/38*  (2014.01)
*G05B 15/02*  (2006.01)
*G05B 19/4061*  (2006.01)

(52) U.S. Cl.
CPC ............ *B23K 26/38* (2013.01); *G05B 15/02* (2013.01); *G05B 19/4061* (2013.01); *G05B 2219/36199* (2013.01); *G05B 2219/49157* (2013.01)

(58) Field of Classification Search
CPC .......... G05B 19/4061; G05B 2219/36199; G05B 2219/49157; G05B 15/02; B23K 26/38
USPC .............. 700/186, 219, 121.67, 122
See application file for complete search history.

(56) References Cited

U.S. PATENT DOCUMENTS

| | | | | |
|---|---|---|---|---|
| 4,897,805 A * | 1/1990 | Wang | ........................ | 345/441 |
| 5,488,698 A * | 1/1996 | Oliver et al. | ............... | 358/1.11 |
| 5,561,534 A * | 10/1996 | Ishida et al. | ................. | 358/448 |
| 6,285,378 B1 * | 9/2001 | Duluk, Jr. | ..................... | 345/441 |
| 6,609,044 B1 | 8/2003 | Basista | | |
| 7,263,219 B2 * | 8/2007 | Ikenoue | ....................... | 382/164 |
| 7,702,416 B2 | 4/2010 | Ravish | | |
| 8,189,080 B2 * | 5/2012 | Ali et al. | ..................... | 348/271 |
| 8,567,892 B2 * | 10/2013 | Kakutani | ....................... | 347/15 |
| 2002/0118124 A1 * | 8/2002 | Azam et al. | ................... | 341/50 |
| 2007/0018988 A1 * | 1/2007 | Guthe | ......................... | 345/441 |

(Continued)

FOREIGN PATENT DOCUMENTS

| | | | |
|---|---|---|---|
| JP | 64-053791 A | 1/1989 | |
| JP | 01-124005 A | 5/1989 | |

(Continued)

OTHER PUBLICATIONS

Crockett, Thomas, W. "An Introduction to Parallel Rendering", Dec. 29, 1997, Elsevier Preprint, pp. 1-29.*

(Continued)

*Primary Examiner* — Kenneth M Lo
*Assistant Examiner* — Derrick Boateng
(74) *Attorney, Agent, or Firm* — Dirk Brinkman; Gene Vinokur (57) ABSTRACT

Locations in a pattern of a part are evaluated to determine if the locations are interior or exterior to a feature of the pattern. The pattern is used to cut the feature from a material by a laser cutting machine. A location in the feature is rendered into an array stored in a memory so that a value stored at an address in the array corresponding to coordinates of the location is either odd or even as determined by a counting process of the rendering. Then, the location is identified as being interior if the value is odd, and as being exterior if the value is even. The rendering can use modified forms of either rasterization or ray casting.

24 Claims, 11 Drawing Sheets

(56) References Cited

U.S. PATENT DOCUMENTS

| | | | |
|---|---|---|---|
| 2008/0309676 A1* | 12/2008 | Nehab et al. | 345/582 |
| 2008/0310758 A1* | 12/2008 | Kashibuchi | 382/293 |
| 2009/0309898 A1* | 12/2009 | Nakamura et al. | 345/647 |
| 2009/0312862 A1* | 12/2009 | Fagan | 700/160 |

FOREIGN PATENT DOCUMENTS

| | | |
|---|---|---|
| JP | 10-231091 A | 9/1989 |
| JP | 02-051786 A | 2/1990 |
| JP | 06-190576 A | 12/1994 |
| JP | 09-114435 A | 2/1997 |
| JP | 09-220685 A | 8/1997 |
| JP | 09-223243 A | 8/1997 |
| JP | 2005-349520 A | 12/2005 |
| JP | 2010-092479 A | 4/2010 |

OTHER PUBLICATIONS

"Computer Graphics Course: Polygon Filling, Rasterization" Hebrew University of Jerusalem, Nov. 30, 2005, pp. 1-21 http://www.cs.huji.ac.il/course/2005/cg/slides/polyfill_6.pdf.*

Nooruddin, Fakir, S. and Turk, Greg, "Simplificaiton and Repair of Polygonal Models Using Volumetric Techniques" Apr.-Jun. 2003, IEEE Transactions on Visualization and Computer Graphics, vol. 9, No. 2 pp. 191-205.*

Thibault, William, "Rasterization" Jun. 3, 2005, Cal State Eastbay, pp. 1-3.*

Jung et al. "Ocree-based hierarchical distance maps for collision detection." Journal of Robotic Systems. Wiley, New York, NY, USA. vol. 14, No. 11, Jan. 1, 1996.

* cited by examiner

METHOD AND SYSTEM FOR CUTTING FEATURES FROM SHEET MATERIALS WITH A LASER CUTTER ACCORDING TO A PATTERN

FIELD OF THE INVENTION

This invention relates generally to moving a laser cutter according to a pattern to cut features from a sheet of material, and more particularly to moving the laser cutter along detours so as to avoid collisions between the cutter head and features previously cut from the material.

BACKGROUND OF THE INVENTION

Laser Cutting of Sheets of Material

Cutting features from sheet material according to a pattern is a common manufacturing process. Generally, a laser cutter head is translated in a bounded plane along orthogonal axes. Laser cutters of this type are often used to cut discreet features from plastic and metal sheets of varying thickness. Control of the laser cutter is usually performed by a computer numerical controller (CNC) following a prescribed instruction list known as "nc-code," or "g-code."

Two types of laser cutter head movements are typically used. Pure translation or lateral movement can be performed by very rapid lateral motion in the plane of the material while the laser is continuously ON. This type of movement is preferred.

Head-up/down movements are relatively slow. This type of movement typically requires stopping the cutter head and turning the laser OFF/ON while performing the head up/down movement. Therefore, this type of movement should be avoided as much as possible to minimize production time. Hence, two types of basic movements are define, rapid lateral movement, and slow up/down movement.

Closed and Nested Features

A part is defined by a pattern of lines, straight or curved, that can be followed by the laser cutter head as specified by the instructions of the code. A feature is defined by one or more connected lines, and the part is defined by a set of one or more features. Often the features are nested. The lines of some features are closed so that the feature can be cut from of the material. Unclosed features, e.g., slits, along the edges of the pattern can also be cut.

CAD/CAM and G-Code

The part and set of features is usually specified as a computer aided design (CAD) file. For example, a common CAD file format is the drawing interchange file (DXF) format. Such a file often contains specifications for individual parts that can be repeated using associated scales, rotations, and translations. To maximize material utilization, computer aided nesting (CAN) is often performed to automatically position the set of parts in a minimal amount of material. After the geometry of all the parts is specified, which is called a "job," a computer aided manufacturing (CAM) program can be used to generate the actual g-code instructions to effect the execution of the job. CAM output is almost always specific for the laser cutter that performs the g-code instructions.

Collisions

The sheet material can be arranged horizontally on a support structure. The support structure usually has spaced-apart vertical bars or pins to allow features cut from the material to fall through and be removed from the work area. Large or irregularly shaped features may not fall through the support structure and can possibly collide with the cutter head. This is a problem. Such collisions are very costly due to the delicate nature of the cutter head and the time to repair, which makes it very important to avoid previously cut features so that the work process is not interrupted.

Head Up/Down

One solution avoids possible collisions with previously cut features by lifting the cutter head after each cut, traversing laterally to the next feature to be cut, and then returning the head to the down position. However, the head-up and head-down movements are notoriously slow compared to the lateral movements, adding significant time and complexity to the job, which increases cost and reduces efficiency. Hence, that method of collision avoidance is suboptimal.

U.S. Pat. No. 6,609,044 determines a bounding box around each feature to be cut, and ensures that the cutter head does not cross the bounding box. Although that method is effective in avoiding collisions without the use of slow head-up/down movements, the use of a bounding box is very inefficient for many common patterns.

U.S. Pat. No. 7,702,416 uses a drawing specification for motion control, of, e.g., a cutting machine. Elements in the drawing are ordered according to, e.g., a nesting or distance from the center of the drawing specification. Code is generated for implementing motion control based on the identified elements and the order. The generated code can include inserted operations such as raise, lower, and move operations.

Rendering

There are two basic rendering techniques, rasterization and ray casting. Both techniques typically use a frame buffer. A frame buffer is an array stored in a memory. Addresses of the array correspond to coordinates of pixel in the image to be produced. The pixels can be assigned values, such as intensities, colors, transparency, opacity, and the like. In conventional rendering the values relate to the visual appearance of what is being rendered.

Rasterization converts a 2D image space representation of features in a scene to a raster format, and the resulting pixel values are determined. When a graphics pipeline is used, a stream of polygon, e.g., triangles, with vertices, edges and faces are transformed to the pixels values in the array.

In ray casting, the scene is parsed pixel by pixel by casting rays out from a point of view. Where scene features are intersected, the pixel values are evaluated, e.g., the color value of the feature at the point of intersection becomes the value of that pixel in the array. Again, the pixels can be assigned appearance values, such as intensities, colors, transparency, opacity, and the like.

SUMMARY OF THE INVENTION

During laser cutting, large or irregularly shaped features may not fall through a support structure when parts are cut. This is a problem because the cutter head can possibly collide with cut features.

The embodiments of the invention provide a solution to the above problem by moving the cutter ahead along detours so that such already cut features are avoided.

Locations in a pattern of a part are evaluated to determine if the locations are interior or exterior to a feature to be cut from the pattern. The pattern is used to cut the feature from a material by a laser cutting machine. If the locations are all interior, then the locations are part of a feature that is to be cut, otherwise they are not, and the locations can be used to detour around the part after the part is cut.

A location in the feature is rendered into an array stored in a memory so that a value stored at an address in the array corresponding to coordinates of the location is either odd or even as determined by a counting process of the rendering.

Then, the location is identified as being interior if the value is odd, and as being exterior if the value is even. The rendering can use modified forms of either rasterization or ray casting.

As an advantage, the rendering can be performed in a graphics processor unit or rendering pipeline to speed up processing well beyond conventional methods.

The laser cutter can be detoured around features previously cut from a material by a laser cutting machine according to a pattern using the determined locations. A hierarchical nesting tree that corresponds to a nesting order of all features is constructed according to testing, wherein each node in the tree represents one feature, and a root of the tree corresponds to a combination of the features. The features are then cut according to the nesting order while detouring around the features previously cut from the material.

DETAILED DESCRIPTION OF THE PREFERRED EMBODIMENTS

Part, Pattern, and Features

Figure 1:
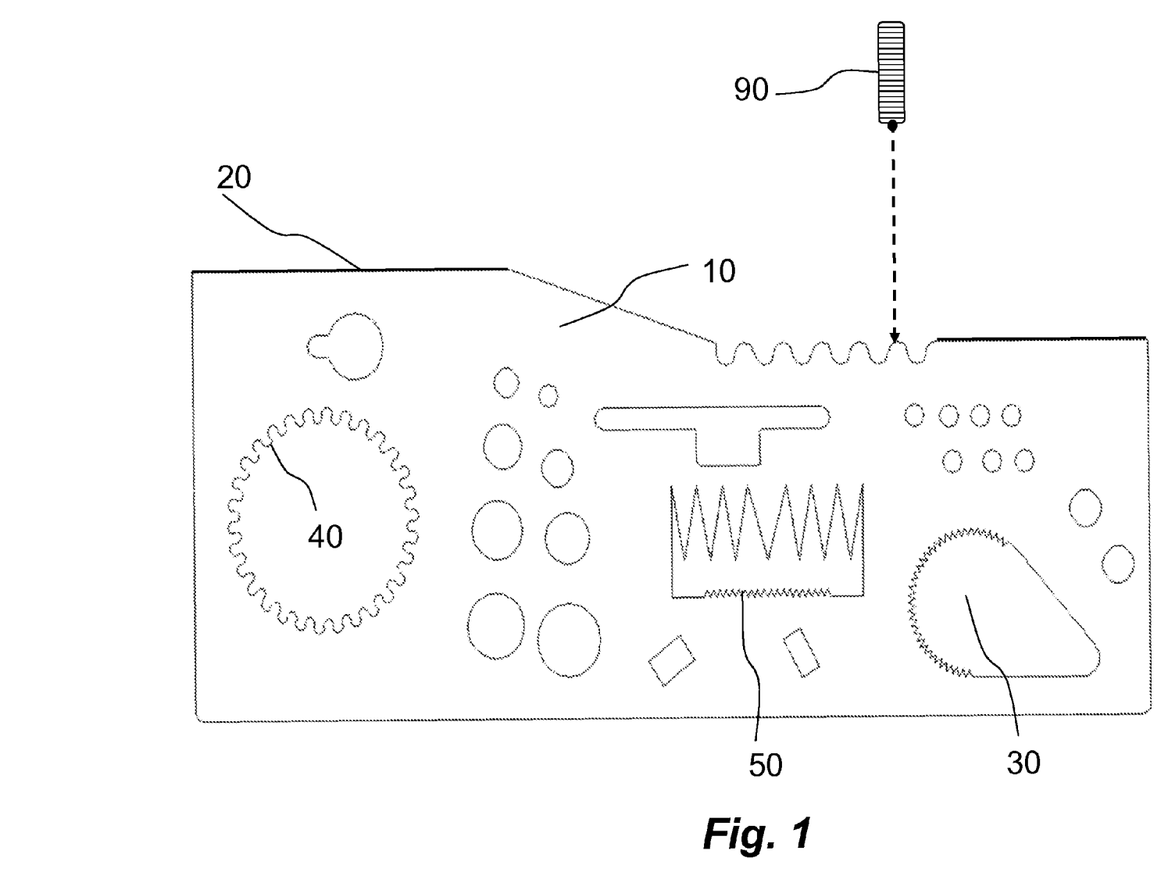
FIG. 1 is a schematic of a pattern exemplifying a part to cut from a sheet of material according of embodiments of the invention.

FIG. 1 shows a pattern for a part 10 to be cut out of a sheet 20 of material using a laser cutter 90. Patterns are typically read from a CAD/CAN/CAM file that specified the individual components, e.g., arcs, lines, or circles among other possibilities. Typically, the sheet is laid on a support structure. In some applications, the structure can support multiple sheets, which are all cut concurrently. The support structure typically includes spaced apart vertical members so that waste material can be removed to avoid collision with the cutter head.

The part is defined by an exterior outline 30, and interior outlines 40 of features to be cut and removed from the material. The outlines are formed by straight or curved lines. Some features 50 cannot fall through the support structure because the features are larger than the spacing in the support structure, or have irregular shapes, which can catch on the edges of the support structure. In either case, those features can collide with the cutter head.

Laser Cutting System Overview

Figure 2:
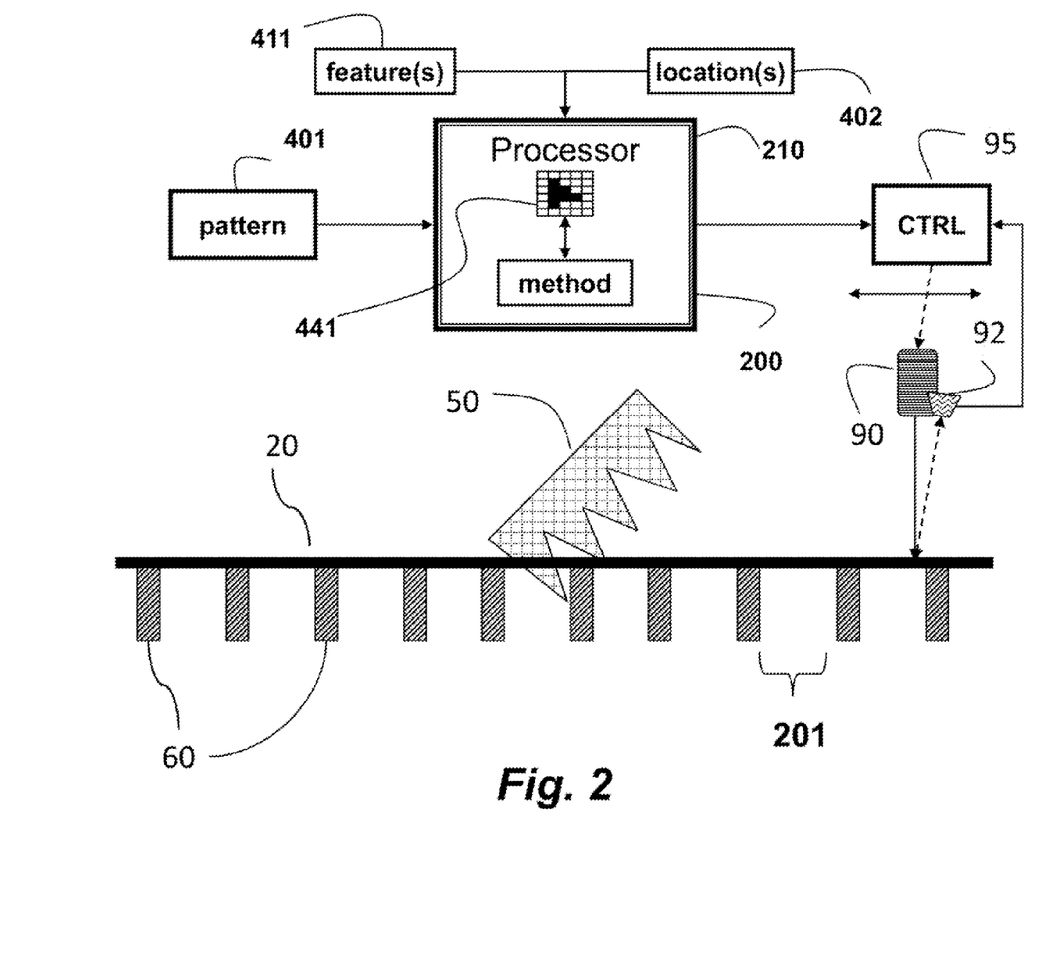
FIG. 2 is a schematic of a laser cutting system for cutting material supported on a support structure according to embodiments of the invention.

FIG. 2 shows the protruding feature 50 substantially perpendicular to a plane of the sheet 20 on the support structure 60. Because the spacing 201 in the support structure is too small, the feature cannot be removed, and can collide with the cutter head 90. This can also occur for irregularly shaped features that engage with the part or support structure.

FIG. 2 also have how a pattern 401, feature(s) 411 and location(s) 402 can be input to a method 200 performed in a processer 210 to determine if a location is interior or exterior to the feature, as described in detail below. The processor includes memory and input/output interfaces as known in the art. The memory can store an array of the locations with associated values as described herein.

The interior/exterior indications can be used to control the movement of the cutter head 90 so that previously cut features are avoided. The movement can be performed by a controller 95. The controller can move the head laterally, up/down, and turn the laser ON and OFF. There can also be an attached capacitive sensor 92 to feed back the exact location of the sensor above the material being cut.

The movement can also consider nested features, or joints between partially cut features and the material so that features can be held in place by the joint, while other features are cut, until it is save to remove the joint from the partially cut feature.

Multiple locations can be tested for one or more features. In addition, the locations relative to the features can also be used to determine if some features are nested within other features, also as described below. This can assist detouring of the cutter head.

Due to the potential cost associated with collisions, it is very desirable to avoid head movements that can result in collisions. We first describe two methods to precisely identify interior and exterior locations in relation to a closed feature to be cut. Subsequently, we also describe methods and solutions for detouring the laser cutter head around areas where collisions can potentially occur.

Interior Exterior Location Identification

We describe two embodiments of a method that enables evaluation of locations within the part to be tested for being enclosed by any arbitrary closed feature. With these embodiments, it is now possible to perform any of the following:
 (a) determining a precise shape and position of a feature to be cut out of the sheet;
 (b) determining a nesting pattern for the part, i.e., which features are nested within other features;
 (c) determining a cutting order of the features; and
 (d) retaining joints between features partially cut from the material.

By using (a), it is possible to identify locations to be avoided when moving the cutter head. By using (b), the nested features can be put in order for cutting to avoid making cuts inside previously cut features, which can result in collisions, and retaining joints to hold partially cut features in place until it is safe to cut the features.

Rendering

Both methods use a rendering process applied to the features. One rendering process uses rasterization, and the other ray casting. The rendering is adapted from graphics rendering techniques as described above. However, instead of generating pixel appearance values for the array in the frame buffer, the "pixels" store values that indicated whether a location corresponding to particular array coordinates are interior or exterior to a feature. This has nothing to do with appearance as known in prior art rendering.

Rasterization

The first embodiment of the rendering uses the rasterization. Rasterization renders polygons onto an image plane, or an array of (pixel) values. Typically, the polygons are represented as collections of triangles. The triangles are represented by three vertices. At a very basic level, rasterizers, such as a rendering pipeline, simply takes the stream of vertices and fills the pixels in the triangles appropriately.

The second embodiment uses ray casting for the rendering. Ray casting traces a path from a location along the (viewing) direction of the ray in the material plane and determines intersections with the feature, such as crossing boundaries (outlines).

The addresses in the array correspond to the coordinates of the locations in the sheet material. Both rendering methods set values in the array to either odd or even by a counting process as described herein. The odd and even values are associated with interior and exterior locations, respectively. The interior and exterior odd/even indications can be used to control the movement of the laser cutter. It should be understood that the meaning of the odd/even values can be reversed depending on the initial value used.

Preprocessing of Intersecting Lines

Figure 3:
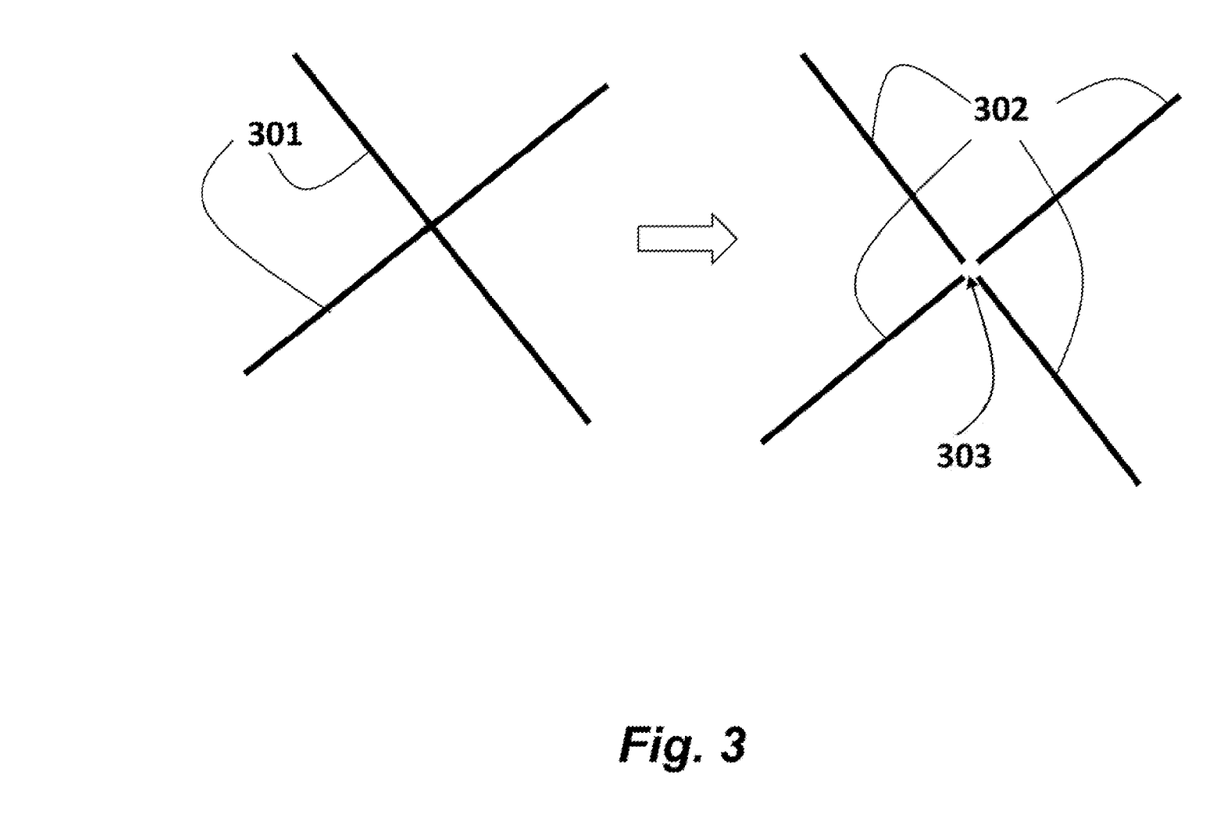
FIG. 3 is a schematic of preprocessing intersecting lines in the pattern according to embodiments of the invention.

Prior to rendering, as shown in FIG. 3, the pattern for the part is preprocessed as follows. When two lines 301 intersect, the intersecting lines are bisected at the intersection 303 of the two lines to form four new shorter lines 302. Overlapping lines, or line-segments, are removed. That preprocessing allows precise construction of disjoint features.

Identifying Features

Features in the pattern can be identified in any number of ways. One way starts at a rightmost location of a union of all entities in the pattern, e.g., lines, and traverses the pattern by visiting subsequent line endpoints in a consistent manner.

When no new location can be visited other than the previous location, the feature is identified as an open feature, and associated lines are removed from the feature. When a previously visited location is encountered, the feature is marked as closed. This way, a pair of features is either nested, or disjoint, although the features can possibly share parts of their outlines.

Additionally, after this process closed features now have minimally just an outline. Other preprocessing methods are possible, depending on the application.

Rasterization

Figure 4A:
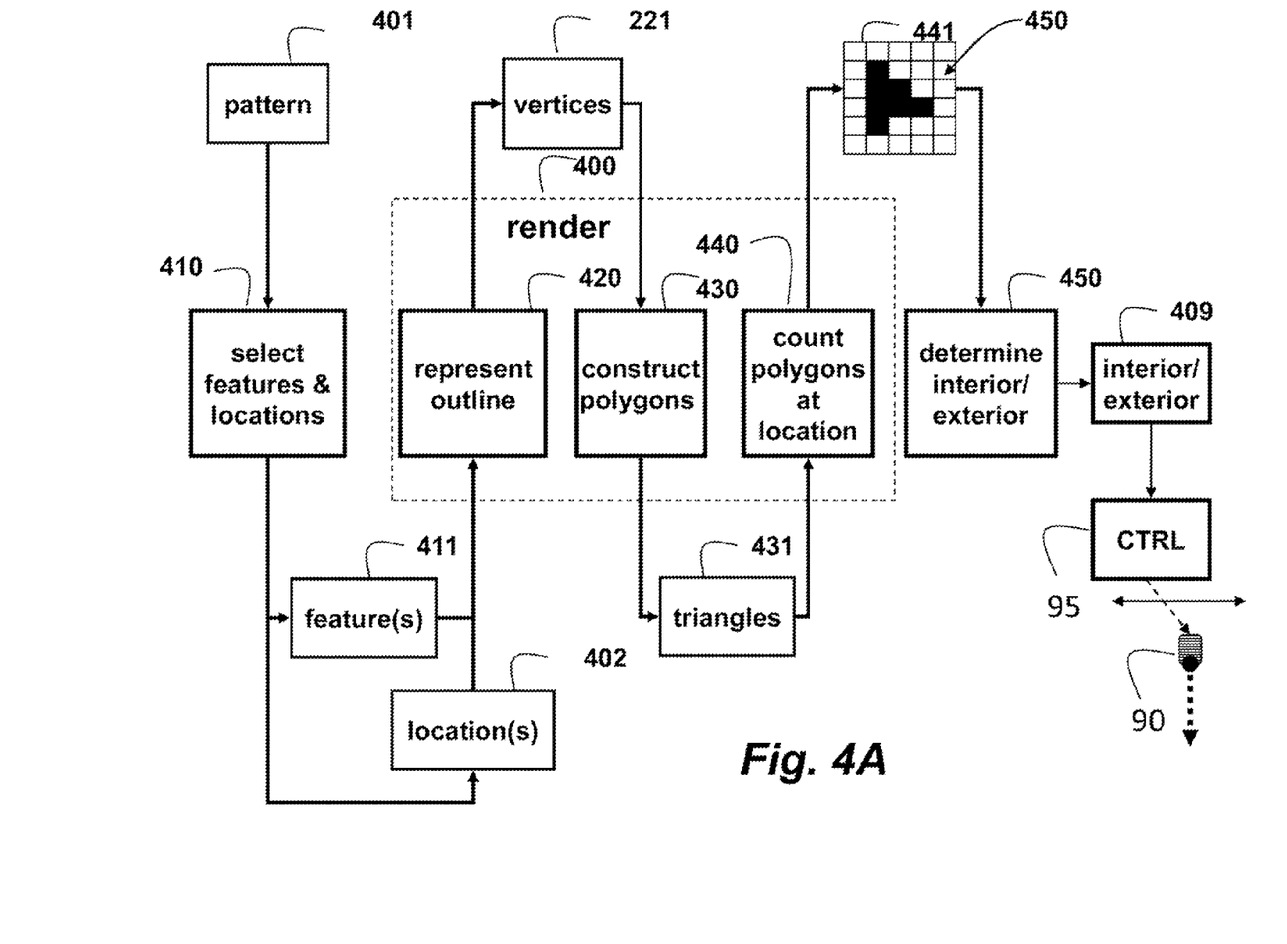
FIG. 4A is a flow diagram of a method for determining whether locations are interior or exterior to a feature using a rasterization rendering process according to the embodiments of the invention.

FIG. 4A shows a first embodiment of a method for determining whether location(s) 402 are interior or exterior to feature (s) 411 of a pattern 401 used by the laser cutting machine 90. Of particular interest are features within a closed outline (closed features). Closed features are to be avoided after cutting. The feature 411 and location 402 to be processed are selected 410.

In the rasterization based rendering 400, the outline of the feature is represented 420 by a list of outline vertices 221. As used herein generally, a list is any ordered set of items. The vertices can be equally spaced along the outline, although this is not necessary.

A list of polygons, e.g., triangles, 431 is constructed 430 using the outline vertices. The polygons are rasterized 440 as an array 441 stored in a memory. During the rasterization, the number of time a location is rasterized is counted as described below. This can be done with a graphics processing unit (GPU), where execution can be extremely fast. The array has addresses that correspond to coordinates of the locations. Each location corresponds to a pixel 450. Then, it can be determined 450 whether the location 402 is interior or exterior to the feature 401, by checking the value of the array 441 at the corresponding location 402.

In the rendering embodiment, lines in the pattern associated with the feature are represented by vertices so that piecewise straight line segments between two adjacent vertices approximate the lines.

The vertices are used to construct the list of polygons (triangles) that exactly covers all locations within the feature. The way that the triangles are constructed is somewhat arbitrary.

Figure 4B:
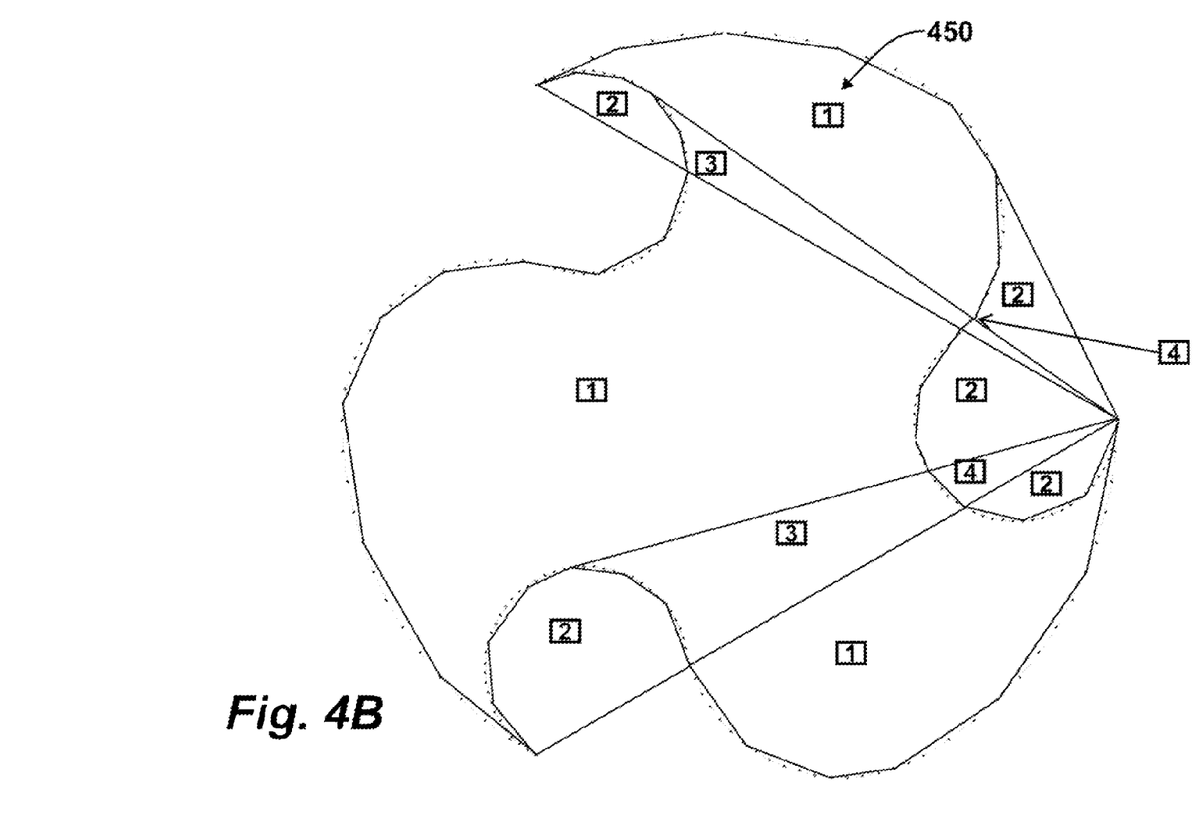
FIGS. 4B-4C are schematics of results for a counting process for rasterization for sample locations according to the embodiments of the invention.
Figure 4C:
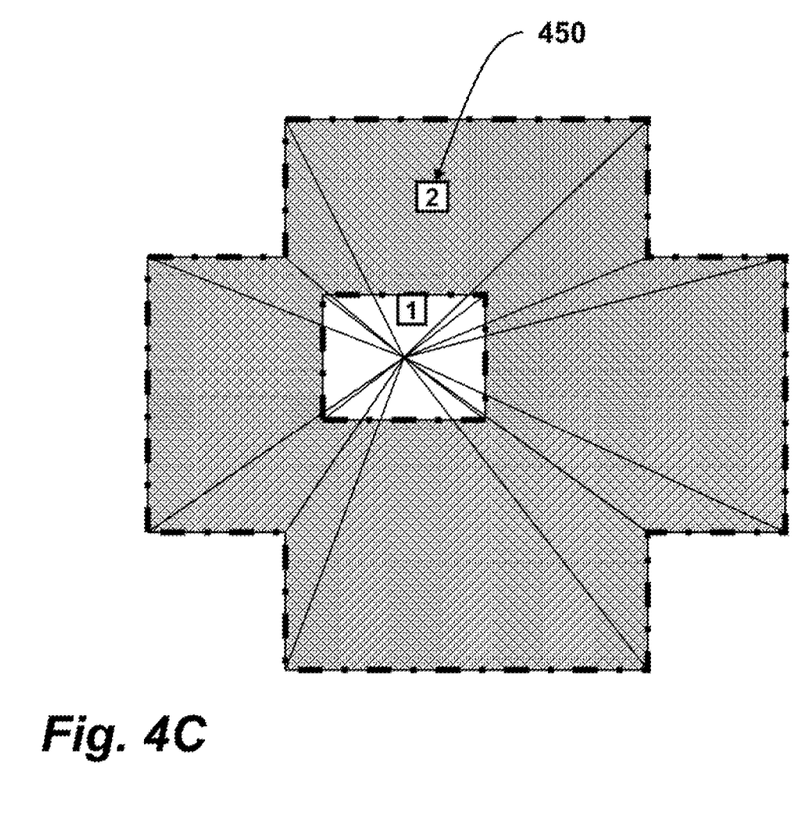

FIGS. 4B-4C show example components that are used to construct a list of (exaggerated) tessellated triangles. The components were rendered using the rasterization method to determine effective interior and exterior locations. The level of tessellation can be controlled to produce piece-wise linear approximations to arbitrary accuracy—up to digital representation limits.

The list of triangles is rendered into the array. Effectively, each address in the array could be referred to as a pixel 450. The pixels are manipulated as follows.

Initially, the value at each array address is zero or some other known value. One possible rendering technique counts the number of times a particular pixel (location) 450 is contained within a rendered triangle, see FIGS. 4B-4C for example. The counts are shown inside the pixels, i.e., the addresses in the array corresponding to the locations.

This can be done by incrementing the values stored at the pixel. Another rendering technique uses a single bit at each address, and inverts the value (0 or 1) each time the pixel is rendered as part of a triangle. Both the incrementing and inverting can be considered a counting process, wherein the inverting of one bit counts in base 2 arithmetic.

In either case, after the feature has been rendered, the addresses have either odd or even values due to our counting process. The odd and even values correspond to the interior and exterior locations, respectively. The values can be used to plan and control movement of the cuter head.

FIGS. 4B-4C show resulting odd/even counting values for example locations and triangles used by the counting process for rendering.

Ray Casting

Figure 5A:
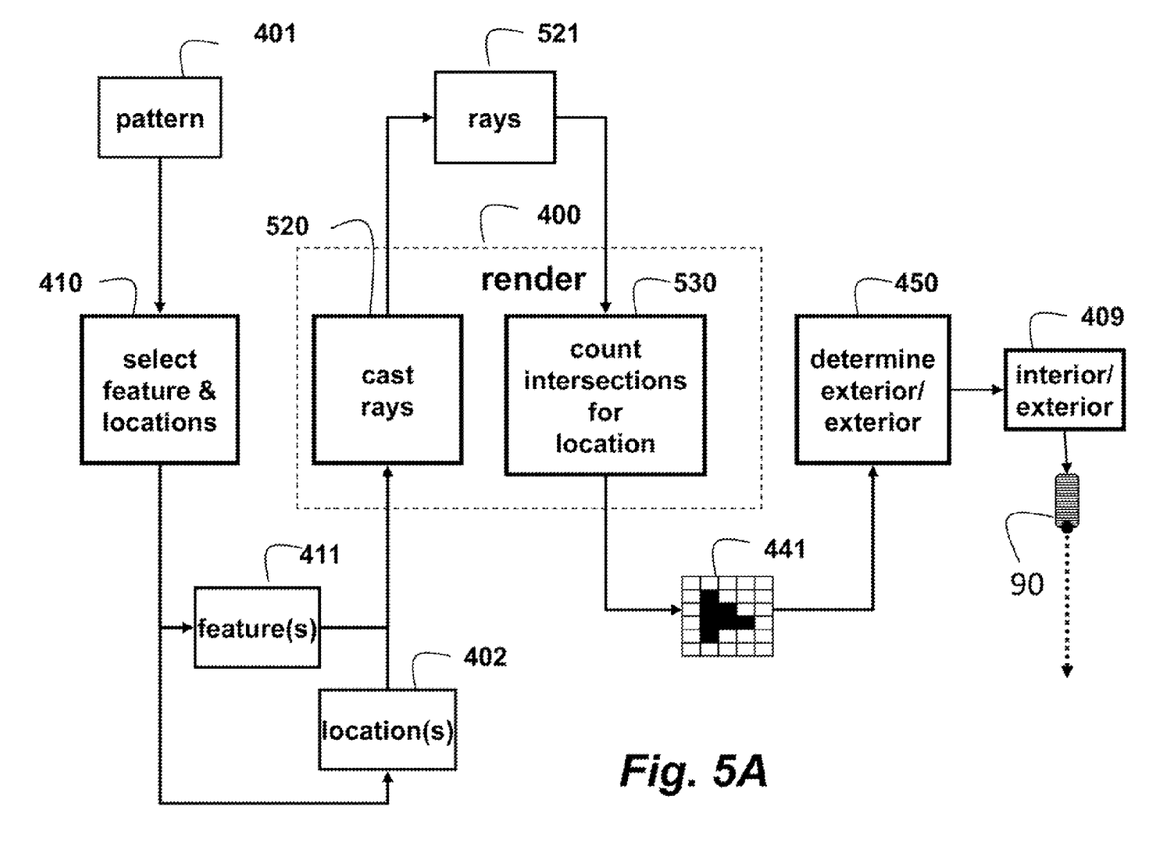
FIG. 5A is a flow diagram of a method for determining whether locations are interior or exterior to a feature using a ray casting rendering process according to the embodiments of the invention.

As shown in FIG. 5A, the second embodiment is similar to the first embodiment as far as using a counting process to determine array values during the rendering. However, instead of rasterizing polygons, the second embodiment uses rays casting during the rendering 400.

As before, the feature 411 and 2D location 402 is selected. At least one ray 521 is cast 520 from the location in some arbitrary (viewing) direction. Any intersections between the ray and any outlines of the feature are detected 530 and counted, see FIG. 5B for example. Then, it is determined 540 whether the 2D location is interior to the feature based on the detected number of intersections.

The detection uses the value of the array stored in the memory as before. The values are initialized to zero. The rays can be directed in arbitrary directions. For convenience, the magnitudes of the rays confine the ray within the pattern plus a small margin. If the ray has an odd number of intersections, the location is interior, otherwise the location is exterior.

To determine if a specific location is contained within the feature, only a single ray can be cast. If the ray intersects the feature outline only once (odd), the location must be interior, if twice, then the count is even and the location is interior. Analytic techniques can be used to determine intersection between the ray and lines of the feature in many cases, e.g., arcs and lines. In the case that the closed feature is composed of higher-order curves, iterative methods can be used to count the number of intersections.

Figure 5B:
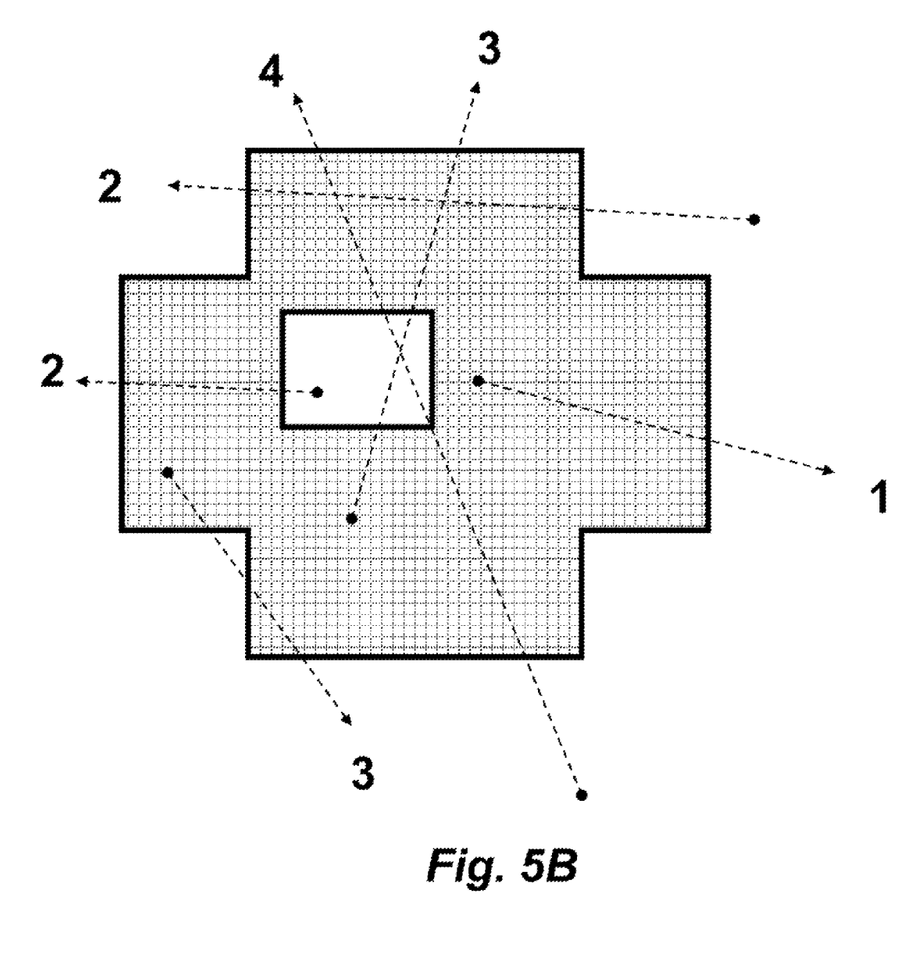
FIG. 5B is a schematic of results for a counting process for ray casting for sample locations according to the embodiments of the invention.

FIG. 5B shows resulting odd/even values of pixels for locations in an example component and rays used by the counting process for ray casting. FIG. 5B is for the same component as shown in FIG. 4C, but this time rendered using rasterization.

Cutter Head with Capacitive Sensor

Sometimes, it is not sufficient to consider a single location as being either interior or exterior to a given feature because some laser cutter heads have a tolerance to which the head can extend over gaps in the material being cut. Such is the case with laser cutter heads that have the attached capacitive sensor 92 to determine a geometric relationship between the head the material, e.g., distance and location. Here, it is often the case that a predetermined portion of the capacitive sensor is over material, e.g., the portion can be about of 50% or larger.

The current method can be augmented to handle such situations by considering a neighborhood of locations around the head position and directly under the laser cutter capacitive sensor. If the percentage of locations in the neighborhood that are considered exterior to the feature(s) exceeds some minimum threshold, then that head position can be considered safe for centering the laser cutter head.

Problem Area Handling by Detours

After identifying features that can result in a collision, the detour path of the cutter head can be determined to avoid such areas, by adopting a "detour strategy." Optimally, the detour strategy avoids using slow head-up and head-down movements. We describe the following methods that avoid both collisions and head-up/down movements.

Although we describe our invention with respect to areas in material that should be avoided due to the existence of waste material that may result in a collision with the laser cutter head, there may be additional areas in the material that should be avoided by the laser-cutter head.

Such areas, which we generally refer to as "no-travel zones," can also be detoured using the methods described in the following inventions. The no-travel zone can be specified by the locations as determined above. Locations of the path that cross and violate the no-travel zones are avoided and removed so that the laser cutter detours around the no-travel zone when performing lateral movements while cutting the features.

Nested-Order Cutting

If all locations within a closed feature are determined, then it is possible to determine whether a feature is nested within another feature.

Using the rendering methods described above, one, some, or all of the locations on the boundary of the feature are tested for inclusion. If a particular feature is included in any other feature is entirely interior to the other feature. If each feature is tested for inclusion in every other feature, then a hierarchical nesting tree can be constructed that corresponds to the nesting relationship between all features in a pattern. In the tree each node represents a feature, and a root of the tree corresponds to the part, or some other collection of the features.

Figure 6:
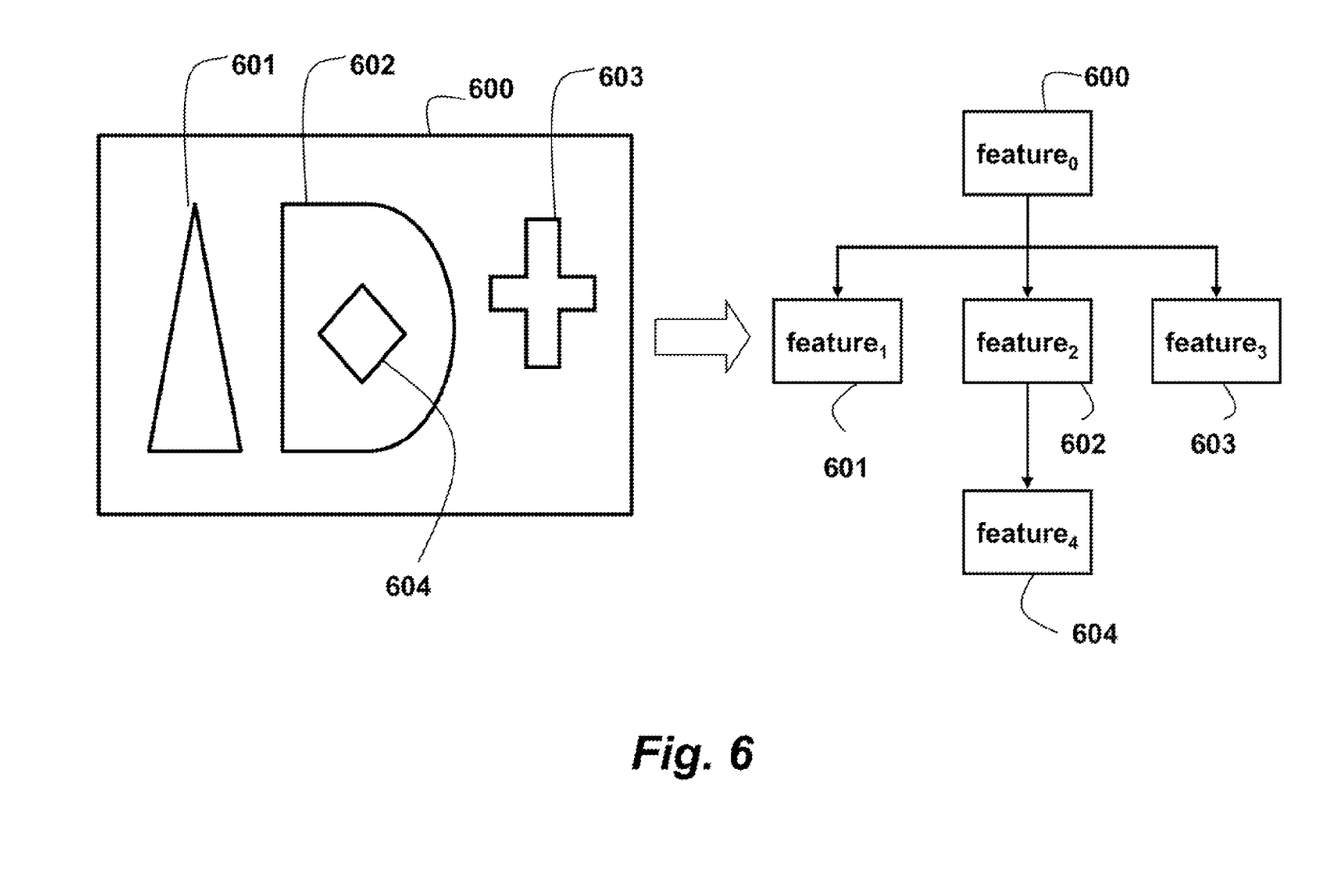
FIG. 6 is a schematic of an example part with nested features, and a corresponding hierarchical tree structure that defines a nesting order for the example part according to the embodiments of the invention.

FIG. 6 shows an example nesting relationship where features$_n$ 601-603 are each nested within feature 600, and feature$_4$ 604 is nested within feature$_2$ 602. The nesting order of the multiple features determines how the detouring of the cutter head.

After the nesting relationship between the features in a part are known, a cutting order to avoid collisions can be determined. The cutting order follows an inverse hierarchy of the tree, i.e., the features are cut in a "bottom-up" order of the tree, and features on the same level of the tree can be cut in an arbitrary order, or a predetermined order as described below.

This method is insufficient to avoid all collisions, but it is necessary to ensure a proper order for cutting features. One method for generating a cutting order that obeys the nesting order is to perform a depth first search of an ordered stack such that each feature is added to the cutting list when it is popped from a last-in-first out stack.

Boundary Detour

Features that have no specific nesting relationship to other features are also a potential source for collisions when performing lateral cutter head movements between features. In such cases, potential collision can be determined by considering if locations along the paths of lateral movement ever lie within a feature that was cut previously.

If such a case occurs, then a detour strategy is adopted. As described previously, one detour strategy involves turning the laser OFF followed by a head-up of the laser to a safe height, perform the rapid lateral movement, and then a head-down and laser ON to continue cutting. Although effective, this approach is suboptimal because it consumes extra time.

Figure 7A:
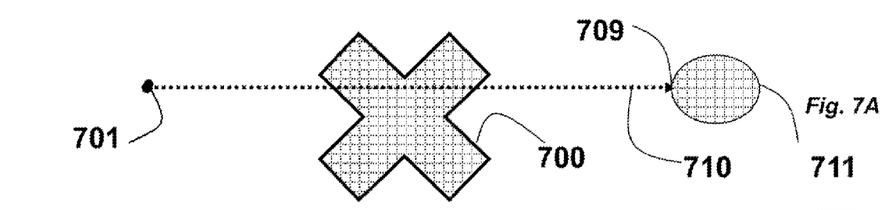
FIGS. 7A-7C are schematics of detouring a cutter head to avoid previously cut feature according to the embodiments of the invention.
Figure 7B:
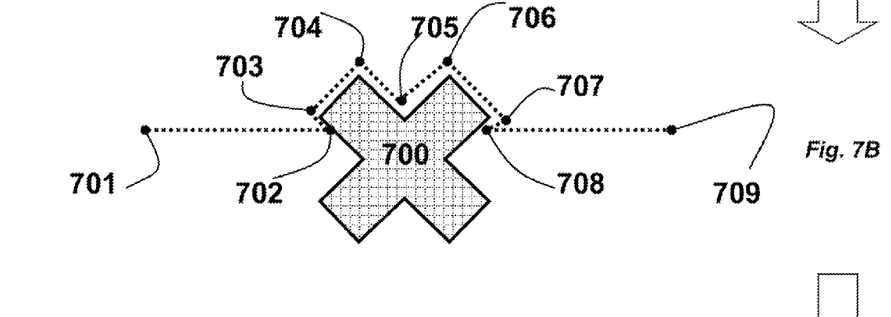
Figure 7C:
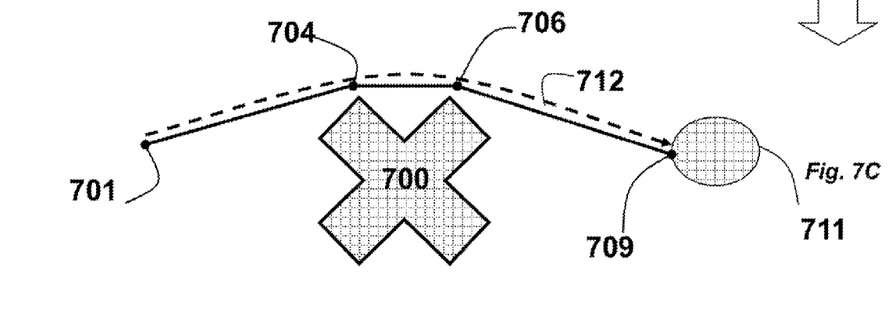

As shown in FIGS. 7A-7C, a better detour strategy is along a path that follows an outline of the previously cut feature that is being crossed during the lateral movement at a predetermine distance from the outline, wherein the predetermined distance ensures no collision between the cutter head and the feature.

As shown in FIG. 7A, a previously cut feature 700 is potentially crossed by a single, straight lateral movement 710, from location 701 to location 709 of another feature 711 to be cut.

As shown in FIG. 7B, the lateral movement path is transformed from a single straight segment 710, to a series of segments 701-709 that follow the outline of the feature. This lateral movement can be constructed by:

(1) marking the entering and exiting locations 702 and 708 for a particular feature for the original rapid lateral movement 710;
(2) determining a shortest direction of travel around the feature between the entering and exiting locations;
(3) replacing the original rapid lateral segment 710 by a series of short segments that mimic the cutting movements that comprise the followed outline of the feature; and
(4) dilating these segments away from the feature boundary to ensure a collision cannot occur between the cutter head and the previously cut feature.

The lateral movement produced by the above strategy may not be the optimal movement to avoid crossing the previously cut feature because it can involve multiple, stopping, reversing, and starting movements.

As shown in FIG. 7C, another strategy prunes the series of short segments to only use locations 701, 704, 706 and 709. Only the locations that are absolutely necessary to avoid the feature are retained.

This can be accomplished by, starting with the first location along the lateral movement, testing the starting location of each segment comprising the lateral movement against every subsequent segment starting location to determine if a previously cut feature is crossed. Note that all features should be tested for crossing, not just the original feature.

If a segment is found that does not cross any feature, then it becomes a candidate to replace the segments it spans. Then, a new segment can be generated that joins the starting location and the last location which can be reached without crossing the feature. Then, testing proceeds from the end location of the new segment.

For example, following the labels in the second illustration, location 701 is tested against 703, 704 (ok), and 705, 706, 707, 708, 709 (not ok), which results in a new segment being created between location 701 and 704; then, location 704 is tested against 706 (ok), and 707, 708, 709 (not ok), which generated a segment from location 704 to location 706; location 706 is then tested against location 708 (not ok) and 709 (ok), which results in a segment joining location 706 to location 709. Thus, a new lateral movement 712 is generated with a minimal number of segments that successfully avoids any potential collisions with the laser cutter and the previously cut feature.

Alternatively, a spline can be fitted to the remaining locations to produce a smooth arced path 712. The arced path is shown with dashed lines, and the minimal short straight segment path with continuous lines. However, for this strategy to be effective, the controller on which the gcode will be executed must be able to execute such motions.

Cut-On-Cross Method

Figure 8:
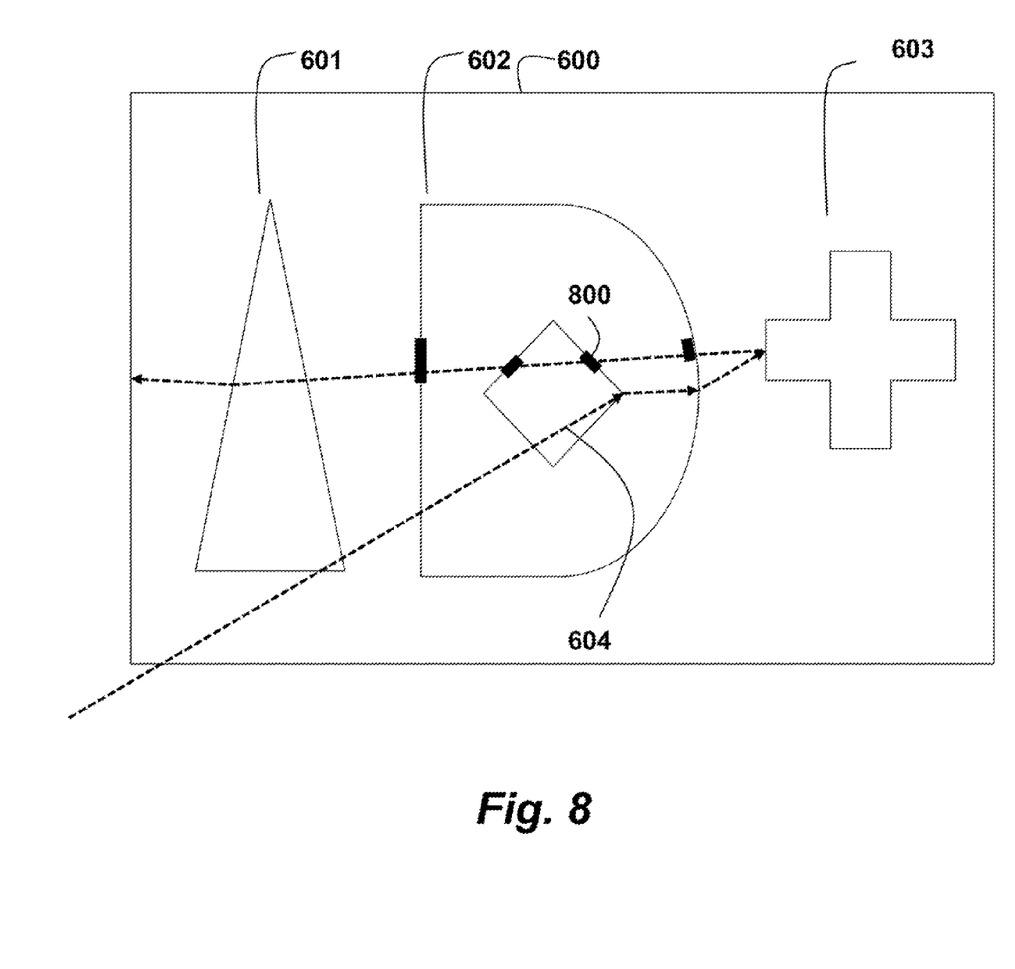
FIG. 8 is a schematic for generating and deleting joints between features and a material to avoid previously cut feature according to the embodiments of the invention.

As shown in FIG. 8, another method to avoid collisions with previously cut features involves delaying a cut that would result in the feature becoming detached from the material until no further crossings are possible. Such a strategy can be implemented in a number of ways.

We describe a preferred method that leaves small 'joints' between features and the material from which the features are partially cut.

FIG. 8 shows an example of this method for the part 600. The dashed line indicates the output of a previous CAM stage that follows the nesting order of the features, and starts at the bottom-left corner. As such, the laser begins by cutting the two middle features 602 and 604, then the 'plus' feature 603, but as it is moving between the plus and triangle feature 601, it crosses two previously partially cut features. Such a lateral movement could result in a collision between the cutter head and material.

Instead of detouring around the gaps in the material left from cutting the features, we can instead momentarily turn the laser off during the initial cutting of the features at the intersection between the feature and the final movement that crosses the feature. This results in a few (at least two) small joints, thick line 800, that hold the feature to the material, thus avoiding the creation of the gap that can otherwise cause problems.

Then, during the final movement, the laser is momentarily turned ON while crossing the joints that were left. Therefore, using this method, crossing a previously cut-out feature is precluded, as the feature is not completely cut from the material until the final crossing lateral movement after all features have been partially cut.

The steps of all of the above described methods can be performed in the processor 210 shown in FIG. 2. The methods can also be implemented using OpenGL, a stencil buffer, and a frame buffer.

Effect of the Invention

As an advantage, the invention enables cutting features from sheet materials without using slow up/down cuter head movements of the laser cutting machine, while still avoiding collisions.

As another advantage, the rendering techniques can use extremely fast conventional processors, such as GPUs, rendering pipelines, and parallelized multi-core CPUs.

The invention can also minimize the time required to detour around previously cut features.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for cutting a feature from a material with a laser cutter according to a pattern of a part comprising steps of:
    Rendering locations of the pattern into an array stored in a memory so that a value stored at an address in the array corresponding to coordinates of at least one of the locations has an odd parity and so that another value stored at an address in the array corresponding to coordinates of at least one other location of the locations has an even parity as determined by a counting process of the rendering; and
    Identifying each location in the pattern of said part as interior to the feature cut from the pattern when the value is odd parity, and exterior when the other value is even parity;
    Commanding the laser cutter to move through each location only if the location is identified as exterior to the feature, while avoiding crossing each location that is identified as interior to the feature, wherein the laser cutter is commanded to move only within a single plane during the cutting of all features from the material, wherein the steps are performed in a processor.

2. The method of claim 1, wherein the rendering uses rasterization.

3. The method of claim 2, wherein the rasterization further comprises:
    representing the feature by a list of triangles;
    rasterizing the list of triangles into the array; and
    incrementing the value each time the location is rasterized by one of the triangles.

4. The method of claim 1, wherein the rendering uses ray casting.

5. The method of claim 4, wherein the ray casting further comprises:
    casting a ray from the location;
    incrementing the value each time the ray crosses an outline of the feature.

6. The method of claim 1, further comprising:
    rendering the feature at multiple locations; and
    determining if the feature is nested within another feature according to the odd and even values.

7. The method of claim 1, further comprising:
    rendering multiple features at multiple locations to obtain multiple values; and
    moving a cutter head of the laser cutting machine only in a plane of the material while cutting the multiple features from the material.

8. The method of claim 1, further comprising:
    initializing values of the array to zero.

9. The method of claim 7, wherein each location is presented by a single bit in the array.

10. The method of claim 1, wherein the rendering uses a graphics pipeline.

11. The method of claim 7, further comprising:
    determining a cutting path for the multiple features based on the values.

12. The method of claim 1, further comprising:
determine a shape and location of the feature based on the values.

13. The method of claim 7, further comprising:
determine a nesting order of the multiple features.

14. The method of claim 7, further comprising:
retaining joints between the multiple features to be cut to avoid collisions with previously partially cut features.

15. The method of claim 1, wherein lines in the pattern is preprocessed, and the preprocessing further comprises:
bisecting two intersecting lines to form four shorter lines;
removing overlapping lines to construct disjoint features in the pattern.

16. The method of claim 7, wherein the cutter head includes a capacitive sensor, and ensuring a predetermined portion of the capacitive sensor is over material while cutting.

17. The method of claim 7, further comprising:
detouring the cutter head around a previously cut feature.

18. The method of claim 17, wherein the detouring is according to a nesting order of the multiple features.

19. The method of claim 18, wherein the nesting order is represented by a hierarchical tree structure, wherein each node in the tree represents one feature, and a root of the tree corresponds to a combination of the features, or the entire part.

20. A laser cutting machine, comprising:
a cutter head;
a memory configured to store an array, wherein addresses of the array correspond to coordinates of locations in a pattern of a part to be cut by the laser head from a material;
a processor to perform the steps of: rendering locations of the pattern into an array stored in a memory so that a value stored at an address in the array corresponding to coordinates of at least one of the locations has an odd parity and so that another value stored at an address in the array corresponding to coordinates of at least one other location of the location has an even parity as determined by a counting process of the rendering; and
Identifying each location in the pattern of said part as interior to the feature cut from the pattern when the value is odd parity, and exterior when the other value is even parity;
a controller for commanding the laser cutter to move through each location only if the location is identified as exterior to the feature, while avoiding crossing each location that is identified as interior to the feature, wherein the laser cutter is commanded to move only within a single plane during the cutting of all features from the material, wherein the steps are performed in the processor.

21. The laser cutting machine of claim 20, wherein the rendering uses rasterization.

22. The laser cutting machine of claim 20, wherein the rendering uses ray casting.

23. The laser cutting machine of claim 20, wherein the processor is a rendering pipeline.

24. The laser cutter machine of claim 20, wherein the processor is a graphics processing unit.

* * * * *